US012596372B2

(12) United States Patent
Yan et al.

(10) Patent No.: US 12,596,372 B2
(45) Date of Patent: Apr. 7, 2026

(54) METHOD FOR CONTROLLING MOVEMENT OF MOVING BODY AND RELATED DEVICE

(71) Applicant: HUAWEI TECHNOLOGIES CO., LTD., Shenzhen (CN)

(72) Inventors: Hua Yan, Hangzhou (CN); Yumin Wu, Hangzhou (CN); Guangguan Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 184 days.

(21) Appl. No.: 18/464,562

(22) Filed: Sep. 11, 2023

(65) Prior Publication Data

US 2023/0418298 A1 Dec. 28, 2023

Related U.S. Application Data

(63) Continuation of application No. PCT/CN2022/072429, filed on Jan. 17, 2022.

(30) Foreign Application Priority Data

Mar. 12, 2021 (CN) .......................... 202110268449.6
May 31, 2021 (CN) .......................... 202110605622.7

(51) Int. Cl.
G05D 1/00 (2024.01)
(52) U.S. Cl.
CPC .................................. G05D 1/0214 (2013.01)
(58) Field of Classification Search
CPC .. G05D 1/0214; G05D 1/0248; G05D 1/2464;
G05D 1/0289; G05D 1/622; G05D 1/633;

B25J 9/1697; B25J 9/1676; B25J 5/007;
B25J 9/162; B25J 9/1656; B25J 9/1664;
B25J 9/1666; B25J 11/0085; G05B
2219/39091; G05B 2219/40442; G05B
2219/35145; G05B 19/4061; G05B
2219/39082; G05B 2219/40317;
(Continued)

(56) References Cited

U.S. PATENT DOCUMENTS 10,303,180 B1      5/2019   Prats
10,668,621 B1 *    6/2020   Caldara ..................... G06T 7/70
(Continued)

FOREIGN PATENT DOCUMENTS

CN          107206592  A      9/2017
CN          108459599  A      8/2018

OTHER PUBLICATIONS

International Search Report and Written Opinion in International Appln. No. PCT/CN2022/072429, mailed on Mar. 18, 2022, 19 pages (with English translation).
(Continued)

*Primary Examiner* — Esvinder Singh
(74) *Attorney, Agent, or Firm* — Fish & Richardson P.C.

(57) ABSTRACT

A method for controlling movement of a moving body includes: obtaining a first voxel set of an obstacle, where the first voxel set includes at least one first voxel that identifies the obstacle in space in which the moving body is located; determining a valid moving path based on a mapping relationship between a voxel and a moving path and the first voxel set; and controlling the moving body to move along the valid moving path.

20 Claims, 4 Drawing Sheets

(58) Field of Classification Search
CPC ........... G05B 2219/40339; G05B 2219/40371;
G05B 2219/40507; G05B 2219/49143;
G05B 2219/49157; G05B 2219/40475;
G05B 2219/40476; G05B 2219/40477;
A47L 2201/04; B60W 60/0011; B60W
60/0016; B60W 60/0027; B60W 30/09;
B60W 30/095; B60W 30/0953; B60W
30/0956
See application file for complete search history.

(56) References Cited

U.S. PATENT DOCUMENTS

| | | | | |
|---|---|---|---|---|
| 10,723,024 | B2 | 7/2020 | Konidaris et al. | |
| 11,016,491 | B1 * | 5/2021 | Millard | .................. G06N 3/045 |
| 2019/0240835 | A1 | 8/2019 | Sorin et al. | |
| 2019/0272665 | A1 | 9/2019 | X et al. | |
| 2022/0276654 | A1 * | 9/2022 | Lee | ...................... G05D 1/0214 |
| 2023/0273031 | A1 * | 8/2023 | Cai | ...................... G05D 1/0217 |
| | | | | 701/26 |

OTHER PUBLICATIONS

Extended European Search Report in European Appln No. 22766081.
8, dated Jun. 14, 2024, 13 pages.

* cited by examiner

N'

N

O'

O

M (M')

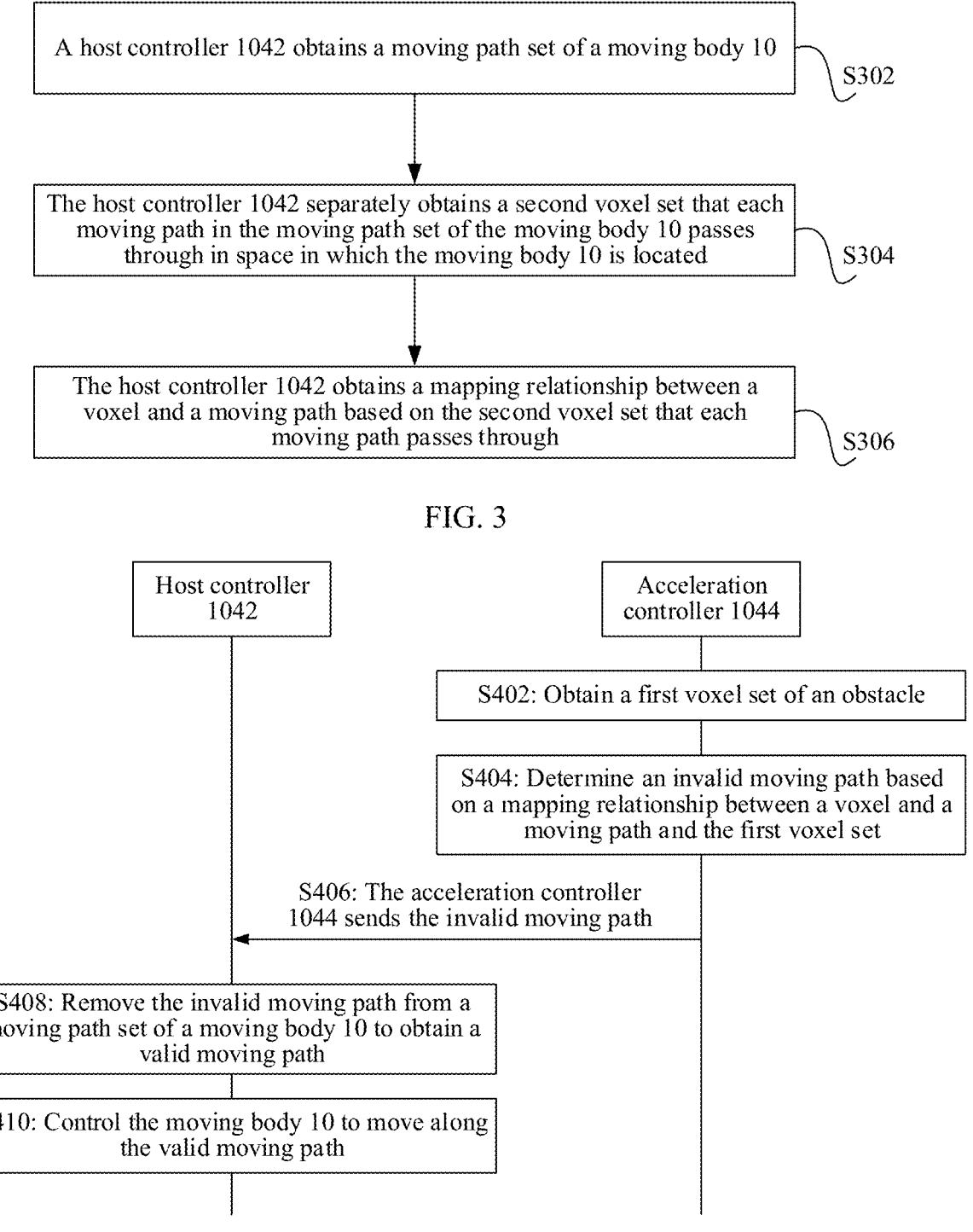

A host controller 1042 obtains a moving path set of a moving body 10
S302

The host controller 1042 separately obtains a second voxel set that each moving path in the moving path set of the moving body 10 passes through in space in which the moving body 10 is located
S304

The host controller 1042 obtains a mapping relationship between a voxel and a moving path based on the second voxel set that each moving path passes through
S306

FIG. 3

Host controller 1042

Acceleration controller 1044

S402: Obtain a first voxel set of an obstacle

S404: Determine an invalid moving path based on a mapping relationship between a voxel and a moving path and the first voxel set S406: The acceleration controller 1044 sends the invalid moving path S408: Remove the invalid moving path from a moving path set of a moving body 10 to obtain a valid moving path S410: Control the moving body 10 to move along the valid moving path

FIG. 4

METHOD FOR CONTROLLING MOVEMENT OF MOVING BODY AND RELATED DEVICE

CROSS-REFERENCE TO RELATED APPLICATIONS

This application is a continuation of International Application No. PCT/CN2022/072429, filed on Jan. 17, 2022, which claims priority to Chinese Patent Application No. 202110605622.7, filed on May 31, 2021, and Chinese Patent Application No. 202110268449.6, filed on Mar. 12, 2021. All of the aforementioned patent applications are hereby incorporated by reference in their entireties.

TECHNICAL FIELD

This application relates to the field of computer technologies, and in particular, to a method for controlling movement of a moving body, a control apparatus, a control system for a moving body, a moving body, a computer-readable storage medium, and a computer program product.

BACKGROUND

With the advancement of computer technologies, path planning is needed in many occasions to realize corresponding functions. For example, in the autonomous driving field, a driving path of a vehicle usually needs to be planned. For another example, in the robot field, a moving path of a robot usually needs to be planned. The vehicle or the robot may encounter a dynamic obstacle during movement. How to implement path planning of real-time obstacle avoidance during the movement becomes a major concern in the industry.

At present, a probabilistic roadmap (PRM) algorithm is usually used in the industry for the path planning. The PRM algorithm first establishes all candidate moving paths in a current scenario offline, and then performs collision detection on a dynamic obstacle and all the moving paths online (where "online" may also be referred to as "during running"), to remove a path that causes a collision, and obtain a set of valid paths, and finally searches the set of valid paths for a planned path.

The collision detection is mainly implemented by using a complex algorithm, for example, an axis-aligned bounding box (AABB) algorithm. The AABB algorithm defines a bounding box. The bounding box is a collision shape aligned with a coordinate axis. The collision shape is for enclosing an object, for example, enclosing a moving body such as an obstacle or a robot. Based on this, whether the moving body collides with the obstacle may be determined by detecting whether a collision shape that encloses the moving body collides with a collision shape that encloses the obstacle. When the collision shape is a rectangle, whether a collision occurs may be determined by checking whether a horizontal boundary and a vertical boundary of the collision shape that encloses the moving body overlap with those of the collision shape that encloses the obstacle. However, the foregoing bounding box is difficult to express an appearance of a complex moving body such as a mechanical arm. Consequently, accuracy of the collision detection is not high, and accuracy of the path planning is affected.

SUMMARY

This application provides a method for controlling movement of a moving body. According to the method, an appearance of the moving body or an obstacle is accurately expressed by using a voxel obtained by dividing space in which the moving body is located, thereby avoiding impact of inaccurate appearance representation data on detection accuracy. In addition, a valid moving path that does not pass through a voxel in a voxel set of the obstacle can be quickly determined based on a mapping relationship between a voxel and a moving path and the voxel set of the obstacle. In this way, a search range of the moving path can be reduced, time and computing resources are saved, path planning efficiency is improved, and a requirement of the moving body on real-time performance can be met. This application further provides a control apparatus, a control system, a moving body, a computer-readable storage medium, and a computer program product that are corresponding to the foregoing method.

According to a first aspect, this application provides a method for controlling movement of a moving body. The method may be performed by a control system. The control system may include a controller, and the controller may control movement of the moving body. The control system may also include a plurality of controllers, for example, include a host controller and an acceleration controller. The acceleration controller is configured to accelerate path planning, the host controller is configured to control the movement of the moving body, and the host controller and the acceleration controller cooperate to control the movement of the moving body.

During specific implementation, the control system may obtain a voxel set of an obstacle (a static obstacle or a dynamic obstacle). The voxel set is also referred to as a first voxel set. Then, the control system may determine a valid moving path based on a mapping relationship between a voxel and a moving path and the voxel set of the obstacle. The valid moving path indicates a moving path on which the moving body does not collide with the obstacle. Then the control system can control the moving body to move along the valid moving path.

In this method, the space in which the moving body is located is divided into a plurality of voxels, and appearances of the moving body and the obstacle, especially an appearance of a complex moving body (an irregular moving body such as a mechanical arm) and an appearance of a complex obstacle, can be accurately expressed by using the voxels. In this way, detection accuracy is improved, and path planning accuracy is further improved. Further, a valid moving path that does not pass through a voxel in the voxel set of the obstacle can be quickly determined based on the mapping relationship between a voxel and a moving path and the voxel set of the obstacle (the static obstacle or the dynamic obstacle). In this way, a search range of the moving path can be reduced, time and computing resources for determining the moving path are saved, path planning efficiency is improved, and a requirement of the moving body on real-time performance can be met. In addition, in the method, the valid moving path is determined in a table lookup manner. Table lookup belongs to an input/output-intensive task. Compared with a computing-intensive task such as collision detection in a related technology, the table lookup consumes shorter time and consumes fewer computing resources, so that the path planning efficiency is further improved and the computing resources are saved.

In some possible implementations, the foregoing mapping relationship between a voxel and a moving path is obtained by inverting each voxel that each moving path in the moving path set passes through in the space in which the moving body is located. Inverting may be understood as reverse indexing. Based on each voxel that each moving path passes through in the space in which the moving body is located, an index of the moving path to the voxel may be obtained. The index of the voxel to the moving path may be obtained by inverting the foregoing content. In this way, the mapping relationship between a voxel and a moving path may be constructed.

Through the foregoing method, the control system can quickly find the valid moving path based on the mapping relationship between a voxel and a moving path, thereby narrowing the search range of the moving path and improving the path planning efficiency.

In some other possible implementations, before the obtaining a first voxel set of an obstacle, the control system may further pre-construct the mapping relationship between a voxel and a moving path offline. Specifically, the control system may separately obtain a second voxel set that each moving path in the moving path set of the moving body passes through. The second voxel set includes at least one second voxel. Then the control system may obtain the mapping relationship between a voxel and a moving path based on the second voxel set that each moving path passes through. The mapping relationship between a voxel and a moving path indicates a correspondence between each second voxel in the at least one second voxel and each moving path.

Through the foregoing method, the mapping relationship between a voxel and a moving path is pre-constructed, which can provide help for quickly determining the valid moving path, shorten path planning time, improve the path planning efficiency, and further meet the requirement on real-time performance.

In some other possible implementations, when determining the valid moving path, the control system may directly determine the valid moving path in a search manner, thereby improving search efficiency. Specifically, the control system may search the mapping relationship between a voxel and a moving path for a third voxel set different from a first voxel in the first voxel set, where the third voxel set includes at least one third voxel. The control system may compare at least one of a value, an identifier, or an address of a corresponding memory of the first voxel with at least one of a value, an identifier, or an address of a corresponding memory of a voxel included in the moving path. When at least one of the value, the identifier, or the address of the corresponding memory of the first voxel is different from that of the voxel included in the moving path, the first voxel and the voxel included in the moving path are considered as different voxels, and the voxel included in the moving path is the third voxel. Then, the control system may determine the valid moving path based on the third voxel set.

In some other possible implementations, when determining the valid moving path, the control system may first determine an invalid moving path in a search manner, and then remove the invalid moving path from the moving path set, to obtain the valid moving path. Specifically, the control system searches the mapping relationship between a voxel and a moving path for a fourth voxel set the same as the first voxel in the first voxel set, where the fourth voxel set includes at least one fourth voxel. Similarly, the control system may compare at least one of a value, an identifier, or an address of a corresponding memory of the first voxel with at least one of a value, an identifier, or an address of a corresponding memory of a voxel included in the moving path. When one of the value, the identifier, or the address of the corresponding memory of the first voxel is the same as that of the voxel included in the moving path, the first voxel and the voxel included in the moving path are considered as same voxels, and the voxel included in the moving path is the fourth voxel. Then, the control system determines an invalid moving path based on the fourth voxel set, and then removes the invalid moving path from the moving path set to obtain the valid moving path.

In some other possible implementations, the control system may obtain the first voxel set of the obstacle by using a depth camera or a laser radar. The control system may first obtain a point cloud of the obstacle, and then obtain the first voxel set of the obstacle based on the point cloud by using the depth camera or the laser radar. When the laser radar detects the obstacle, the point cloud may be directly output, and the control system may directly obtain the point cloud of the obstacle from the laser radar. For the depth camera, the control system may photograph the obstacle by using the depth camera, to obtain a depth map and a color map, and may obtain the point cloud of the obstacle by performing coordinate conversion based on the depth map and the color map.

When both the depth camera and the laser radar exist, the control system may choose, based on a current application scenario, to obtain the point cloud by using the depth camera or by using the laser radar, so as to obtain the first voxel set of the obstacle based on the point cloud. For example, when the application scenario is a scenario in which the moving body is relatively far away from the obstacle, the control system may choose to obtain the point cloud by using the laser radar, so as to obtain the first voxel set. For another example, when the application scenario is a scenario in which the moving body is relatively close to the obstacle, for example, a scenario in which the moving body is a robot, the control system may choose to obtain the point cloud by using the depth camera, so as to obtain the first voxel set. In one aspect, reliability of the first voxel set may be ensured in the foregoing manner. In another aspect, requirements of different scenarios and different services are met.

In some other possible implementations, the obstacle is a dynamic obstacle or a static obstacle, and the moving body is a movable object. For the static obstacle, the control system may directly perform point cloud conversion, and then obtain the first voxel set based on a point cloud. For the dynamic obstacle, the control system may first obtain location information at a current moment, a movement speed, a movement direction, and the like of the dynamic obstacle, to predict location information at a next moment, and therefore obtain a point cloud at the current moment and a point cloud at the next moment. The control system may obtain a first voxel set at the current moment based on the point cloud at the current moment. The control system may further obtain a first voxel set at the next moment based on the predicted point cloud at the next moment. In this way, the method can meet requirements of different users or different application scenarios.

In some other possible implementations, the method is performed by a processor of the control system, and the processor includes at least one of a central processing unit, a field programmable gate array, and an application-specific integrated circuit.

In some other possible implementations, the mapping relationship between a voxel and a moving path is stored in a memory accessible to the processor. For example, the mapping relationship is stored in the foregoing memory in a form of a table, and is continuously arranged based on an identifier of the voxel. By continuously arranging the mapping relationship, a quantity of reading times can be reduced, and moving paths that pass through nodes can be read in batches, thereby improving search efficiency.

In some other possible implementations, the mapping relationship between a voxel and a moving path may alternatively be stored in a form of two tables. In this embodiment of this application, the two tables are referred to as an address record table and a mapping query table. The address record table indicates a mapping relationship between an identifier of a voxel in the space in which the moving body is located and a storage address of an identifier of a moving path that passes through the voxel. The mapping query table indicates a mapping relationship between the storage address of the identifier of the moving path that passes through the voxel and the identifier of the moving path that passes through the voxel. The identifier of the voxel may be a number of the voxel, and the identifier of the moving path may be a number of the moving path. There may be one or more moving paths that pass through one voxel. Therefore, storage space occupied for storing identifiers of the moving paths that pass through one voxel may be different. For ease of query, the storage address may be represented by a start address and a storage length.

In this method, a data arrangement structure of the mapping relationship between a voxel and a moving path is set as a two-level query structure including the address record table and the mapping query table. An obstacle avoidance identification process of the moving body may be learned by querying the foregoing two tables. Therefore, a process of comparing a large quantity of voxels is simplified into a valid query process, to be specific, a computing-intensive task is converted into an input/output-intensive task, so that time consumption is minimized.

According to a second aspect, this application further provides a control apparatus. The control apparatus includes units configured to perform the method for controlling movement of a moving body according to any one of the first aspect or the possible implementations of the first aspect.

According to a third aspect, this application further provides a control system. The control system includes at least one controller, and each controller includes a processor and a memory. The memory is configured to store computer-executable instructions, and when the control system runs, the processor executes the computer-executable instructions in the memory to perform the method according to any one of the first aspect or the implementations of the foregoing first aspect by using a hardware resource in the control system.

In some possible implementations, the memory may be a component integrated in the processor, or independent of the processor. The controller in the control system may further include a bus. The processor is connected to the memory by using the bus. The memory may include a readable memory and a random access memory.

When the control system includes one controller, the processor in the controller may execute computer-executable instructions stored in the memory, to perform the method according to any one of the foregoing first aspect or the implementations of the first aspect. When the control system includes a plurality of controllers, for example, includes a host controller and an acceleration controller, the host controller and the acceleration controller may cooperate to perform the method according to any one of the foregoing first aspect or the implementations of the first aspect.

According to a fourth aspect, an embodiment of this application provides a moving body. The moving body includes a power system and the control system shown in the third aspect of this application. The control system is configured to perform the method for controlling movement of a moving body according to any one of the first aspect or the implementations of the first aspect, to control the power system to drive a moving component of the moving body to move.

In some possible implementations, the moving body may further include a positioning system. The positioning system may position an obstacle to obtain location information. The control system may obtain a point cloud of the obstacle based on the location information, and may determine a voxel set, for example, a first voxel set, of the obstacle based on the point cloud. The control system may determine a valid moving trajectory based on a mapping relationship between a voxel and a moving path and the foregoing first voxel set, and control the moving body to move along the valid moving trajectory.

According to a fifth aspect, this application provides a computer-readable storage medium. The computer-readable storage medium stores instructions, and when the instructions are run on a computer, the computer is enabled to perform operation steps of the method according to any one of the foregoing first aspect or the possible implementations of the first aspect.

According to a sixth aspect, this application provides a computer program product including instructions. When the computer program product runs on a computer, the computer is enabled to perform operation steps of the method according to any one of the foregoing first aspect or the possible implementations of the first aspect.

In this application, based on the implementations according to the foregoing aspects, the implementations may be further combined to provide more implementations.

BRIEF DESCRIPTION OF DRAWINGS

To describe the technical methods in embodiments of this application more clearly, the following briefly describes the accompanying drawings used in describing embodiments.

FIG. 3 is a flowchart of a method for constructing a mapping relationship between a voxel and a moving path according to an embodiment of this application;

FIG. 4 is a flowchart of a method for controlling movement of a moving body according to an embodiment of this application;

DESCRIPTION OF EMBODIMENTS

The terms "first" and "second" in embodiments of this application are merely intended for a purpose of description, and shall not be understood as an indication or implication of relative importance or implicit indication of a quantity of indicated technical features. Therefore, a feature limited by "first" or "second" may explicitly or implicitly include one or more features.

Some technical terms used in embodiments of this application are first described.

A moving body refers to a movable object. In the industrial field, the moving body may be a mechanical arm, for example, a mechanical arm in an automated production line of a factory. In the transportation field, the moving body may be a vehicle. For example, the vehicle may be a vehicle that supports an autonomous driving function, namely, an autonomous vehicle. In another field, the moving body may alternatively be a robot, for example, a ground sweeping robot or a distribution robot.

A voxel, also referred to as a voxel point, a stereoscopic pixel, a volume pixel, a grid, or a volume grid, refers to a spatial unit in space (for example, a three-dimensional (3D) space) in which the moving body is located. The spatial unit may be a minimum inseparable spatial unit. Considering that types and sizes of space in which moving bodies are located may be different, voxels may be spatial units of different shapes and sizes. In some examples, the voxel may be a cube. The voxel may be obtained by discretizing the space in which the moving body is located and dividing the space into areas. Each voxel has a value, and the value of the voxel may be a plurality of values, for example, coordinate values in a spatial coordinate system, or may be a single value, for example, a single value determined based on the coordinate value, or another indicator value.

A moving path refers to a moving trajectory of the moving body in the space in which the moving body is located. Specifically, the moving path may be represented by a plurality of voxels in the space in which the moving body is located. The moving path may be a straight-line path, or may be a curve path. The moving path may be represented by a set of all voxels that the moving body passes through in the space in which the moving body is located in a moving process of the moving body from a start point to an end point.

Figure 1:
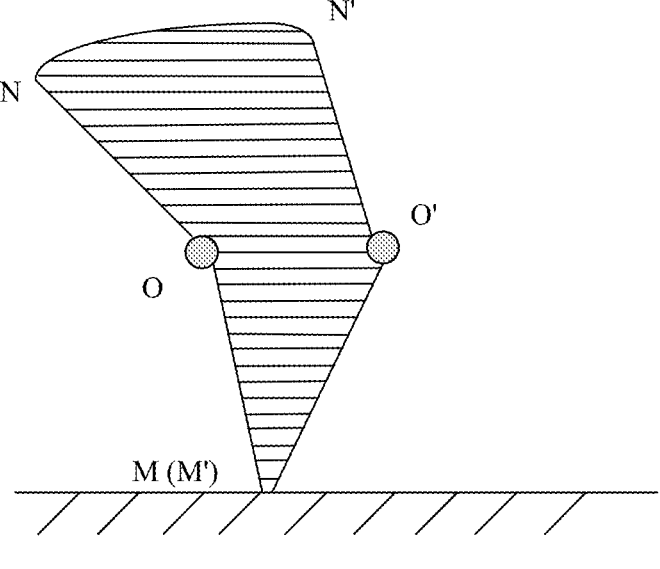
FIG. 1 is a schematic diagram of voxels that a moving body passes through during movement according to an embodiment of this application.

For example, the moving body is a two-axis mechanical arm. As shown in FIG. 1, an endpoint of a mechanical arm (referred to as a first mechanical arm below) in the two-axis mechanical arm is fixed, for example, fixed at a location of a point M on a platform. Before movement, an intersection point of arms in the two-axis mechanical arm is located at a location of a point O, and an endpoint of another mechanical arm (referred to as a second mechanical arm below) of the two-axis mechanical arm is located at a location of a point N. After the two-axis mechanical arm moves, an endpoint of the first mechanical arm moves to a location of a point M', where the point M coincides with the point M'. The intersection point of the arms in the two-axis mechanical arm moves to a location of a point O', and an endpoint of the second mechanical arm moves to a location of a point N'. A moving path of the two-axis mechanical arm may be represented by a set of all voxels that the two-axis mechanical arm passes through in space in which the two-axis mechanical arm is located in a moving process of the two-axis mechanical arm from a start point to an end point. For example, the set of all the voxels are a set of voxels included in an area surrounded by NO, OM, M'O', O'N', and N'N. N'N is a moving trajectory of an endpoint of the second mechanical arm, and the moving trajectory may be a curve.

It should be noted that, in some cases, the set of all voxels that the moving body passes through in the space in which the moving body is located in the moving process of the moving body from the start point to the end point may be a set of all voxels that a straight-line segment from the start point to the end point passes through. That is, the moving path may be represented by the set of all the voxels that the straight-line segment from the start point to the end point passes through. For example, when the moving body is an autonomous driving vehicle, the moving path may be represented by a set of all voxels that at least one straight-line segment from the start point to the end point passes through.

The following further describes a method for controlling movement of a moving body according to this application with reference to the accompanying drawings. The method may be performed by a control system of the moving body. The control system may include a controller, and the controller may control movement of the moving body. The control system may also include a plurality of controllers, for example, include a host controller and an acceleration controller. The acceleration controller is configured to accelerate path planning, the host controller is configured to control the movement of the moving body, and the host controller and the acceleration controller cooperate to control the movement of the moving body.

Specifically, an obstacle may exist in space in which the moving body is located. The obstacle may be a static obstacle, or may be a dynamic obstacle (for example, a movable obstacle). For the static obstacle, the control system may obtain a voxel set of the obstacle, where the voxel set includes at least one voxel that identifies the obstacle in the space in which the moving body is located. For the dynamic obstacle, the control system may obtain a voxel set of the obstacle at a current moment, and predict location information of the obstacle at a next moment based on movement information of the obstacle, such as a movement speed and a movement direction. Then, the control system may obtain a voxel set of the obstacle at the next moment based on the location information of the obstacle at the next moment.

The control system may determine a valid moving path based on a mapping relationship between a voxel and a moving path and the voxel set of the obstacle. The valid moving path indicates a moving path on which the moving body does not collide with the obstacle. Then the control system can control the moving body to move along the valid moving path.

In this method, the space in which the moving body is located is divided into a plurality of voxels, and appearances of the moving body and the obstacle, especially an appearance of a complex moving body (an irregular moving body such as a mechanical arm) and a complex obstacle, can be accurately expressed by using the voxels. In this way, detection accuracy is improved, and path planning accuracy is further improved. Further, a valid moving path that does not pass through a voxel in the voxel set of the obstacle can be quickly determined based on the mapping relationship between a voxel and a moving path and the voxel set of the obstacle (the static obstacle or the dynamic obstacle). In this way, a search range of the moving path can be reduced, time and computing resources are saved, path planning efficiency is improved, and a requirement of the moving body on real-time performance can be met. In addition, in the method, the valid moving path is determined in a table lookup manner. Table lookup belongs to an input/output (I/O)-intensive task. Compared with a computing-intensive task such as collision detection in a related technology, the table lookup consumes shorter time and consumes fewer computing resources, so that the path planning efficiency is further improved and the computing resources are saved.

The following describes the moving body in embodiments of this application with reference to the accompanying drawings.

Figure 2:
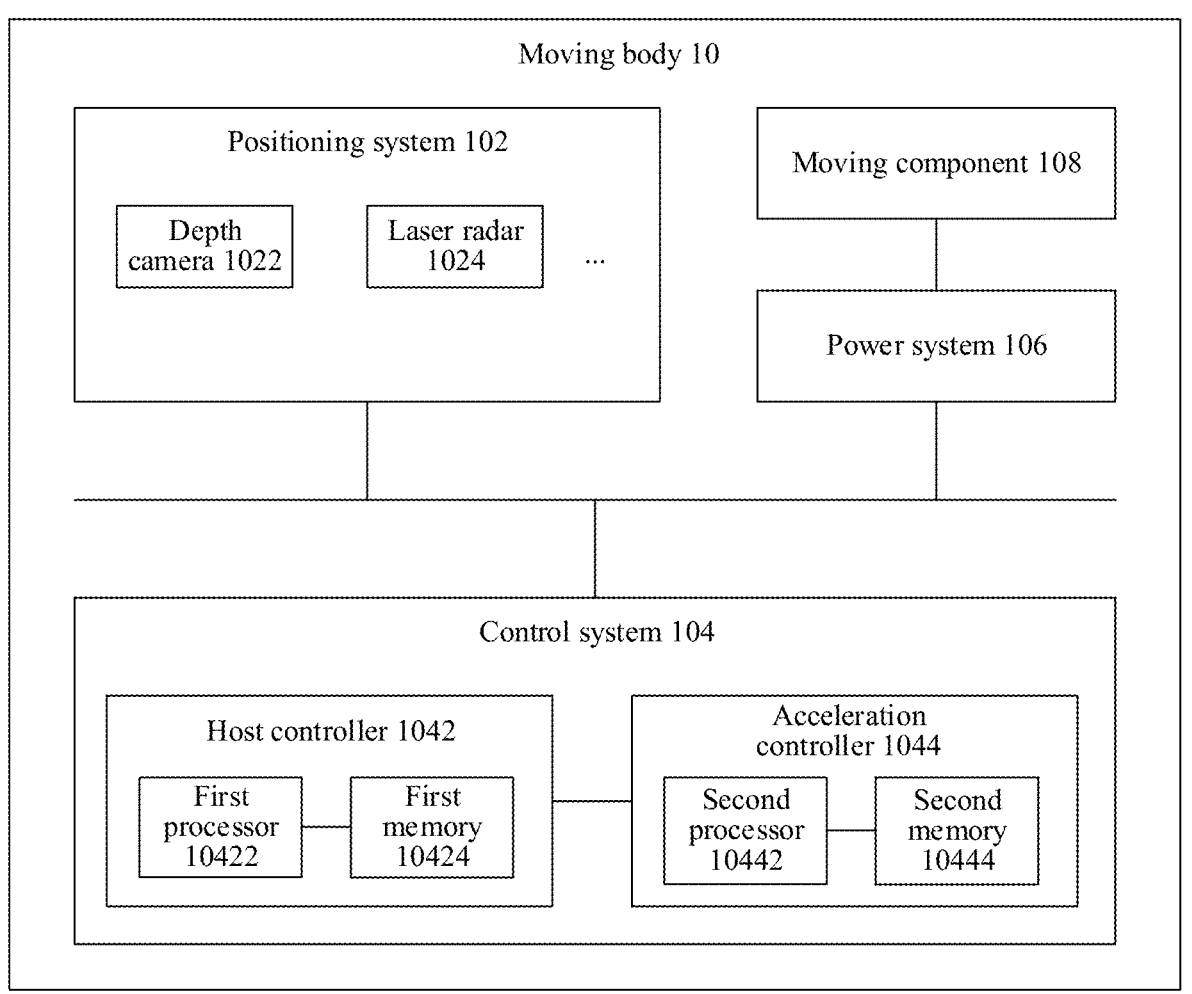
FIG. 2 is a diagram of a system architecture of a moving body according to an embodiment of this application.

Refer to a schematic diagram of a structure of a moving body shown in FIG. 2. As shown in FIG. 2, the moving body 10 includes a positioning system 102, a control system 104, a power system 106, and a moving component 108. The positioning system 102, the control system 104, the power system 106, and the moving component 108 may be connected by using a bus. The bus may be a peripheral component interconnect (PCI) bus or an extended industry standard architecture (EISA) bus. When the moving body 10 is an autonomous driving vehicle, the bus may alternatively be a controller local area network (CAN) bus.

The following describes in detail functions of the positioning system 102, the control system 104, the power system 106, and the moving component 108.

The positioning system 102 is configured to position a target to obtain location information. The target may be the moving body 10, or may be an obstacle in space in which the moving body 10 is located. The positioning system 102 may determine location information of the moving body 10 or location information of the obstacle. When the obstacle is a dynamic obstacle, the positioning system 102 may further obtain the location information of the obstacle in real time. It should be noted that, the location information in this embodiment of this application includes location information of a series of points.

That the positioning system 102 determines the location information of the obstacle is used as an example for description. In some embodiments, the positioning system 102 includes a depth camera. Correspondingly, the location information may be represented by a depth map obtained by photographing the obstacle by using the depth camera. A pixel value of each pixel in the depth map represents a distance from the depth camera to a point in the obstacle. In some other embodiments, the positioning system 102 includes a laser radar. Correspondingly, the location information may be represented by a point cloud obtained by detecting the obstacle by using the laser radar. The point cloud is a set of disordered points obtained by detecting a to-be-detected object by using a measurement instrument such as the laser radar.

The control system 104 is configured to obtain a voxel set of the obstacle. For ease of distinguishing from another voxel set, in this embodiment of this application, the voxel set of the obstacle is referred to as a first voxel set. The first voxel set includes at least one first voxel that identifies the obstacle in the space in which the moving body 10 is located.

In the embodiment shown in FIG. 1, the control system 104 includes the host controller 1042 and the acceleration controller 1044. The host controller 1042 includes a first processor 10422 and a first memory 10424. The acceleration controller 1044 includes a second processor 10442 and a second memory 10444. The first processor 10422 may be any one of a central processing unit, a field programmable gate array (FPGA), an application-specific integrated circuit (ASIC), or a digital signal processor (DSP), and the first memory 10424 may be a memory that can be addressed by the first processor 10422.

For example, when the first processor 10422 is a CPU, the first memory 10424 may be a memory (main memory). The memory may be classified into types such as a static random access memory (SRAM), a dynamic random access memory (DRAM), or a double data rate synchronous dynamic random access memory (DDR SDRAM). The foregoing DDR SDRAM may also be referred to as DDR for short.

Similarly, the second processor 10442 may also be any one of a CPU, an FPGA, an ASIC, or a DSP, and the second memory 10444 may be a memory that can be addressed by the second processor 10442. For example, the second processor 10442 may be an FPGA, and the second memory 10444 may be a DDR.

The control system 104 (for example, the host controller 1042 in the control system 104) may obtain the first voxel set of the obstacle based on the point cloud of the obstacle. Specifically, the control system 104 may determine a value of each voxel based on a value (for example, a coordinate value) of each point in the point cloud and a resolution of the voxel. A point cloud in 100*100*100 three-dimensional space is used as an example. If a resolution of a voxel is 10*10*10, a value of a voxel corresponding to a point whose coordinate value is (50, 50, 50) in the point cloud is (5, 5, 5). It should be noted that, a method for determining the value of the voxel based on the value of each point in the point cloud is not limited in this application, and a conversion process between the point cloud and the voxel may be implemented by using a method in a conventional technology.

It should be noted that, when the positioning system 102 does not include a laser radar, the control system 104 (for example, the host controller 1042 in the control system 104) may further obtain the point cloud of the obstacle based on the depth map of the obstacle. Specifically, the control system 104 may obtain the depth map and a color map (for example, a red green blue (RGB) map) of the obstacle, and then perform coordinate conversion based on the foregoing images to obtain the point cloud of the obstacle.

The color map such as the RGB image provides pixel coordinates (u, v) of a point in the obstacle in a pixel coordinate system, and the depth map provides a distance d from the depth camera to the point in the obstacle, that is, provides a Z coordinate of the point in the obstacle in a camera coordinate system. The control system 104 may determine X and Y coordinates in the camera coordinate system based on the coordinates in the pixel coordinate system and an intrinsic parameter of the depth camera, and then may obtain coordinates (X, Y, Z) of the point in the obstacle in the camera coordinate system based on the depth map. A specific calculation formula is shown in Formula (1):

$$X=Z(u-c_x)/f_x$$

$$Y=Z(v-c_y)/f_y$$

$$Z=d \hspace{4cm} \text{Formula (1)}$$

$f_x$ and $f_y$ are intrinsic parameters of the depth camera, and respectively represent focal lengths of the depth camera in corresponding directions. $c_x$ and $c_y$ are coordinates of an optical center of the depth camera in a pixel coordinate system. When a camera is not distorted, $c_x$ and $c_y$ should be respectively w/2 and H/2. W and H are respectively a width and a height of the image.

Then, the control system 104 (for example, the host controller 1042 in the control system 104) may perform the coordinate conversion based on the coordinates of the point in the obstacle in the camera coordinate system and the extrinsic parameters of the depth camera, for example, a rotation matrix R and a translation matrix T of the depth camera, to obtain coordinates $(X_W, Y_W, Z_W)$ of the point in the obstacle in a world coordinate system.

The control system 104 may obtain $(X_W, Y_W, Z_W)$ by solving the following formula:

$$\begin{bmatrix} X \\ Y \\ Z \end{bmatrix} = R \begin{bmatrix} X_W \\ Y_W \\ Z_W \end{bmatrix} + T \hspace{2cm} \text{Formula (2)}$$

The control system 104 may obtain the point cloud of the obstacle by performing the foregoing conversion on each point of the obstacle. It should be noted that, when the positioning system 102 includes a plurality of depth cameras, the plurality of depth cameras may be configured to photograph the obstacle from different angles of view to obtain corresponding depth images. The control system 104 may further separately perform the coordinate conversion on the plurality of depth images to obtain a plurality of point clouds. Further, the control system 104 may further fuse the plurality of point clouds. For example, the control system 104 may implement point cloud fusion by using point cloud splicing.

When the positioning system 102 includes a laser radar, the control system 104 may obtain the value of the voxel based on the point cloud of the obstacle that is detected by the laser radar and the resolution of the voxel, and then obtain the first voxel set of the obstacle based on the value of each voxel.

When the positioning system 102 includes a depth camera and a laser radar, the control system 104 may choose, based on a current application scenario, to obtain the point cloud by using the depth camera or by using the laser radar, so as to obtain the first voxel set of the obstacle based on the point cloud. Specifically, a detection range of the laser radar is greater than a detection range of the depth camera. Based on this, in a scenario in which the moving body 10 is relatively far away from the obstacle, for example, in a scenario in which the moving body 10 is an autonomous driving vehicle, the control system 104 may obtain the first voxel set by using the laser radar. In a scenario in which the moving body 10 is relatively close to the obstacle, for example, in a scenario in which the moving body 10 is a robot, the control system 104 may obtain the first voxel set by using the depth camera.

It should be noted that, a method for obtaining the value of the voxel based on the point cloud and the resolution of the voxel is not limited in this application, and the value of the voxel may be obtained by using a method in the current technology.

The control system 104 is further configured to control a movement status of the moving body 10. For example, the control system 104 may determine a valid moving path of the moving body 10 based on a mapping relationship between a voxel and a moving path and the first voxel set, and control the moving body 10 to move along the valid moving path. The valid moving path indicates a moving path on which the moving body 10 does not collide with the obstacle.

During specific implementation, the acceleration controller 1044 may obtain the first voxel set of the obstacle, for example, obtain the first voxel set of the obstacle from the host controller 1042, and then determine the valid moving path based on the mapping relationship between a voxel and a moving path and the first voxel set.

When the mapping relationship between a voxel and a moving path includes a mapping relationship between a voxel and a moving path that passes through the voxel, the acceleration controller 1044 may first determine an invalid moving path based on the mapping relationship and the first voxel set. The invalid moving path indicates a moving path that collides with the obstacle, and the moving path may be a moving path that includes the first voxel. The host controller 1042 may obtain the invalid moving path, and remove the invalid moving path from a moving path set, to obtain the valid moving path.

In some possible implementations, when the mapping relationship between a voxel and a moving path includes a mapping relationship between a voxel and a moving path that does not pass through the voxel, the acceleration controller 1044 may directly determine the valid moving path based on the mapping relationship and the first voxel set. The valid moving path is specifically a moving path that does not include the first voxel. Then the host controller 1042 may obtain the valid moving path from the acceleration controller 1044.

The host controller 1042 may control the moving body 10 to move along the valid moving path. There may be a plurality of valid moving paths. The host controller 1042 may select an appropriate moving path from the plurality of valid moving paths. For example, the host controller 1042 may search for the plurality of valid moving paths by using a shortest path search algorithm, to obtain the shortest moving path in the plurality of valid moving paths. Then the host controller 1042 may control the moving body 10 to move along the shortest moving path.

The power system 106 is specifically a system configured to drive the moving body 10 to move. During specific implementation, the power system 106 may include at least one driver. The driver is configured to drive the moving component 108 of the moving body 10, to drive the moving body 10 to move. The moving component 108 refers to a component that enables the moving body 10 to move, and may be, for example, an execution mechanism such as a joint (configured to connect a mechanical arm), a motor, or a steering device. That the control system 104 controls the moving body 10 to move along the valid moving path may specifically be: generating a moving instruction based on the valid moving path, and sending the moving instruction to the power system 106. Then, the power system 106 may drive the moving component 108 to move along the valid moving path in response to the moving instruction.

FIG. 2 is described by using an example in which the control system 104 includes the host controller 1042 and the acceleration controller 1044. In some possible implementations, the control system 104 may include a controller. For example, the host controller 1042 and the acceleration controller 1044 may be combined to obtain a controller. The controller further implements a path planning acceleration function based on an original function. The original function is specifically controlling movement of the moving body 10.

For ease of understanding, an example in which the control system includes a controller is used to briefly describe a process of controlling movement of the moving body 10. Specifically, the controller may obtain the first voxel set of the obstacle, then determine the valid moving path based on the mapping relationship between a voxel and a moving path and the first voxel set, and then control the moving body 10 to move along the valid moving path.

It should be further noted that, the foregoing embodiment is described by using an example in which the moving body 10 includes the control system 104. In some possible implementations, the control system 104 may alternatively be outside the moving body 10. When the external control system 104 is triggered, the control system 104 may obtain the first voxel set of the obstacle, and determine the valid moving path based on the mapping relationship between a voxel and a moving path and the first voxel set. Then, the controller controls the moving body 10 to move along the valid moving path.

In the embodiment shown in FIG. 2, the control system 104 controls movement of the moving body 10 based on the mapping relationship between a voxel and a moving path.

The mapping relationship may be pre-established offline. The control system 104 (for example, the host controller 1042 in the control system 104) may construct the mapping relationship between a voxel and a moving path offline before the moving body moves. The following first describes in detail a method for constructing the mapping relationship between a voxel and a moving path according to an embodiment of this application with reference to the accompanying drawings.

FIG. 3 shows a flowchart of the method for constructing the mapping relationship between a voxel and a moving path. The method may be performed by the control system 104 (for example, the host controller 1042 in the control system 104). The method includes the following steps.

S302: The host controller 1042 obtains a moving path set of a moving body 10.

The moving path set includes at least one moving path. The host controller 1042 may pre-collect moving paths of the moving body 10, to obtain the moving path set of the moving body 10. The host controller 1042 may establish the moving path of the moving body 10 by using a PRM algorithm.

For example, the host controller 1042 may sample N points in space in which the moving body 10 is located in a manner such as uniform sampling or heuristic sampling, where N is a positive integer. Then the host controller 1042 removes, from the N points, a point located in a forbidden area. The forbidden area is an area in which the moving body 10 is forbidden to move, for example, an area occupied by an obstacle. Then, the host controller 1042 connects remaining points to obtain at least one moving path, and the moving path may be represented by a connection line between the points. It should be noted that, when connecting the remaining points, the host controller 1042 may select a nearby connection. For example, for each point, the host controller 1042 may connect K nearest neighbors of the point to the point, where K is a positive integer. Further, when detecting, in a connection process, that a connection line of some points passes through the forbidden area, the host controller 1042 may further delete, from established moving paths, a moving path that passes through the forbidden area, to obtain the moving path set.

S304: The host controller 1042 separately obtains a second voxel set that each moving path in the moving path set of the moving body 10 passes through.

Similar to the obstacle, each moving path in the moving path set may be represented by a voxel set formed by voxels that the moving path passes through in the space in which the moving body 10 is located. For ease of differentiation, in this embodiment of this application, the voxel set formed by the voxel that the moving path passes through in the space in which the moving body 10 is located is referred to as the second voxel set. A voxel in the second voxel set is referred to as a second voxel.

Specifically, the host controller 1042 may sample, in a manner such as uniform sampling or random sampling, points included in the moving path, obtain values (for example, coordinate values) of the points included in the moving path, and then determine values (for example, coordinate values) of voxels based on the coordinate values and a resolution of each voxel. Values of different voxels may be different. The host controller 1042 may determine the second voxel that the moving path passes through in the space in which the moving body 10 is located based on the values of the voxels, so as to obtain the second voxel set.

S306: The host controller 1042 obtains the mapping relationship between a voxel and a moving path based on the second voxel set that each moving path passes through.

Specifically, the host controller 1042 may invert each voxel (for example, a second voxel) that each moving path in the moving path set passes through in the space in which the moving body 10 is located, to construct the mapping relationship between a voxel and a moving path.

For ease of understanding, the following provides descriptions with reference to a specific example. In this example, each voxel is identified by an identifier of the voxel, for example, a number of the voxel, and each moving path may be identified by an identifier representing an edge of the moving path, for example, a number of the edge.

In this example, a second voxel set corresponding to each moving path is shown in Table 1.

TABLE 1

| Number of a moving path | Number of a voxel |
| --- | --- |
| E1 | P1, P2, P3 . . . |
| E2 | P100, P101, P102 . . . |
| E3 | P201, P202, P203 . . . |

E represents an edge, namely, represents a moving path. E1, E2, and E3 are respectively numbers of three moving paths (three edges). P represents a point, namely, represents a voxel. P1, P2, . . . , P203 are numbers of different voxels. A first record indicates that voxels that the moving path E1 passes through are P1, P2, P3, and the like. By analogy, a second record indicates that voxels that the moving path E2 passes through are P100, P101, P102, and the like, and a third record indicates that voxels that the moving path E3 passes through are P201, P202, P203, and the like.

The host controller 1042 may invert each voxel in the second voxel set that the moving path passes through in the space in which the moving body 10 is located, as specifically shown in Table 2:

TABLE 2

| Number of a voxel | Number of a moving path |
| --- | --- |
| P1 | E1, E5, E7 . . . |
| P2 | E1, E7, E10 . . . |
| P3 | E1, E13, E50 . . . |

It can be learned from the foregoing examples of Table 1 and Table 2 that Table 1 records a relationship of voxels included in each moving path based on the moving path, and Table 2 obtained after inverting process records a relationship of moving paths that each voxel passes through based on the voxel.

The host controller 1042 may perform steps of the foregoing method by running a point-edge mapping tool. The point-edge mapping tool may be a software tool or a driver or another software form. For example, the point-edge mapping tool is a software tool. When running the software tool, the host controller 1042 may automatically perform the foregoing steps in a background, so as to automatically construct the mapping relationship between a voxel and a moving path. In some embodiments, the host controller 1042 may also receive, by using point-edge mapping tool, a second voxel set that is configured by a user and that each moving path passes through in the space in which the moving body 10 is located, and then invert each second voxel in the second voxel set that each moving path in the moving path set passes through in the space in which the moving body 10 is located, so as to construct the mapping relationship between a voxel and a moving path.

It should be noted that, in the foregoing example, the mapping relationship that is between a voxel and a moving path and that is established by the host controller 1042 is specifically a mapping relationship between a voxel and a moving path that passes through the voxel. In some embodiments, the host controller 1042 may alternatively establish a mapping relationship between a voxel and a moving path that does not pass through the voxel.

In some possible implementations, the mapping relationship between a voxel and a moving path may be stored in a form of a table. For ease of description, in this embodiment of this application, the table is referred to as a mapping relationship table, and the mapping relationship table is specifically shown in Table 2. The host controller 1042 may store the mapping relationship table in a memory (for example, a DDR), for use in subsequent path planning. Specifically, the host controller 1042 may store the foregoing mapping relationship table in a specific storage manner. For example, the host controller 1042 may store entries in the mapping relationship table based on a sequence of identifiers of moving paths. Correspondingly, the entries of the mapping relationship table may be continuously arranged in the memory based on identifiers of voxels. In this way, when the mapping relationship table is searched for a valid moving path or an invalid moving path, related entries may be obtained in batches. This helps improve query efficiency.

In some other possible implementations, the foregoing mapping relationship between a voxel and a moving path may alternatively be stored in a form of two tables. In this embodiment of this application, the two tables are referred to as an address record table and a mapping query table. The address record table indicates a mapping relationship between an identifier of a voxel in the space in which the moving body 10 is located and a storage address of an identifier of a moving path that passes through the voxel. The mapping query table indicates a mapping relationship between the storage address of the identifier of the moving path that passes through the voxel and the identifier of the moving path that passes through the voxel. The identifier of the voxel may be a number of the voxel, and the identifier of the moving path may be a number of the moving path. There may be one or more moving paths that pass through one voxel. Therefore, storage space occupied for storing identifiers of the moving paths that pass through one voxel may be different. For ease of query, the storage address may be represented by a start address and a storage length.

Further, entries in the address record table may be sequentially stored in the memory based on numbers of voxels. An address of the memory may be sequentially addressed. Therefore, the number of the voxel may alternatively be represented by the address of the memory. It is assumed that the memory is a DDR, and each address may store content of one byte. In this case, the storage address of the identifier of the moving path that passes through the voxel in the address record table may occupy storage space of several bytes in the memory. Two bytes are for storing a start address of the identifier of the moving path that passes through the voxel. The start address may be obtained by the control system 104 by estimating a storage capacity required for storing the mapping relationship, and then applying for a storage block that matches the storage capacity from storage space of the memory. A start address of the foregoing storage block may serve as the start address of the identifier of the moving path that passes through the voxel. Four bytes are for storing a storage length of the identifier of the moving path that passes through the voxel. In an actual application, two additional bytes may be further included to store an invalid bit, and the invalid bit is used for a placeholder for ease of calculation.

This embodiment of this application further provides examples of the address record table and the mapping query table, as shown in the following:

TABLE 3

| Address record table | | |
|---|---|---|
| Identifier of a voxel (represented by an address of a memory) | Start address (four bytes) | Storage length (two bytes) |
| 0x00 (0*8) | 0x10000000 | 0x0008 (8) |
| 0x08 (1*8) | 0x10000008 | 0x0010 (16) |
| 0x10 (2*8) | 0x10000018 | 0x0008 (8) |
| 0x18 (3*8) | 0x10000020 | 0x0008 (8) |

TABLE 4

| Mapping query table | | |
|---|---|---|
| Start address | Identifier of a moving path | Identifier of a moving path that passes through a voxel |
| 0x10000000 | E1 | Moving path that passes through a voxel P1 |
| 0x10000002 | E5 | |
| 0x10000004 | E7 | |
| 0x10000006 | E18 | |
| 0x10000008 | E1 | Moving path that passes through a voxel P2 |
| 0x1000000a | E7 | |
| 0x1000000c | E10 | |
| 0x1000000e | E21 | |
| 0x10000010 | E43 | |
| 0x10000012 | E57 | |
| 0x10000014 | E105 | |
| 0x10000016 | E118 | |

Based on the foregoing Table 3 and Table 4, the control system 104 may directly read, based on a correspondence between the identifier of the voxel (for example, the number of the voxel) and the address of the memory, content in an address corresponding to the identifier of the voxel, to obtain a storage address of the identifier of the moving path that passes through the voxel. Then, the controller or the control system 104 may read data whose length is equal to the storage length from the start address based on the start address and the storage length in the storage address, so as to obtain the identifier of the moving path that passes through the voxel.

For example, for the voxel P1, the control system 104 may directly read content whose addresses are 0x00 to 0x07, to obtain a storage address of an identifier of a moving path that passes through P1. A start address may be 0x10000000, and a storage length is 0x0008. Based on this, the controller or the control system 104 may read content of 0x10000000 to 0x10000007 to obtain an identifier of a moving path that passes through the voxel P1. In this example, the identifier of the moving path that passes through the voxel P1 includes E1, E5, E7, and E18. In other words, a moving path that passes through the voxel P1 includes E1, E5, E7, and E18.

It should be noted that, the third column in the foregoing mapping query table is merely remarks added for ease of understanding. In actual application, the mapping query table may not include content of the third column.

After the mapping relationship between a voxel and a moving path is constructed offline, the control system 104 may directly control movement of the moving body 10 online by using the pre-constructed mapping relationship between a voxel and a moving path. The following describes in detail the method for controlling movement of a moving body 10 according to embodiments of this application with reference to the accompanying drawings.

In some other possible implementations, the foregoing Table 3 and Table 4 may alternatively be stored in a form of one table.

Refer to a flowchart of the method for controlling movement of a moving body 10 shown in FIG. 4. The method includes the following steps.

S402: An acceleration controller 1044 obtains a first voxel set of an obstacle from a host controller 1042.

The obstacle is an object that blocks movement of the moving body 10. The object usually occupies at least one voxel in space in which the moving body 10 is located. Therefore, the obstacle may be identified by using the at least one voxel in the space in which the moving body 10 is located, and a set of at least one voxel that identifies the obstacle is a first voxel set of the obstacle.

Further, the obstacle may be a static obstacle, or may be a dynamic obstacle. For the static obstacle, the first voxel set is fixed, and for the dynamic obstacle, the first voxel set may be different at different moments. When the obstacle is the dynamic obstacle, the acceleration controller 1044 may obtain a first voxel set of the obstacle at a current moment and a first voxel set of the obstacle at a next moment from the host controller 1042.

A value (for example, a coordinate value) that is of a first voxel in the first voxel set of the obstacle and that is obtained by the acceleration controller 1044 from the host controller 1042 may be obtained by the host controller 1042 based on a point cloud of the obstacle and a resolution of the voxel. The host controller 1042 may divide a coordinate value of each point in the point cloud by the resolution of the voxel, to obtain the value of the first voxel, and further obtain the first voxel set.

The point cloud of the obstacle may be obtained by the host controller 1042 by performing coordinate conversion on an image of the obstacle photographed by a depth camera. Specifically, the host controller 1042 may determine coordinates of a point in the obstacle in a camera coordinate system based on a formula (1) and image coordinates of the point in the obstacle and an intrinsic parameter of the depth camera, and then determine coordinates of the point in the obstacle in a world coordinate system based on a formula (2) and the coordinates of the point in the obstacle in the camera coordinate system and an extrinsic parameter of the depth camera, so as to implement the coordinate conversion to obtain the point cloud of the obstacle.

In some possible implementations, the point cloud of the obstacle may alternatively be obtained by the host controller 1042 from a laser radar for detecting the obstacle. Specifically, the laser radar includes a transmitter and a receiver. The transmitter may transmit a laser beam to the obstacle, and the laser beam may generate diffuse reflection when encountering the obstacle, and return to the receiver. A distance from the laser radar to a midpoint of the obstacle may be determined based on a time difference between sending the laser beam by the transmitter and receiving a returned laser beam by the receiver, so that the point cloud of the obstacle may be generated. The host controller 1042 may obtain the point cloud of the obstacle from the laser radar.

When a positioning system 102 includes the depth camera and the laser radar, the host controller 1042 may choose, based on an application scenario, to obtain the point cloud of the obstacle by using the depth camera or the laser radar. For example, when the application scenario is an autonomous driving scenario, for example, the moving body 10 is an autonomous driving vehicle, the host controller 1042 may obtain the point cloud of the obstacle by using the laser radar. Alternatively, when the application scenario is a robot scenario, for example, the moving body 10 is a robot, the host controller 1042 may obtain the point cloud of the obstacle by using the depth camera.

It should be further noted that, when the obstacle is the dynamic obstacle, the host controller 1042 may predict location information of the obstacle at a next moment based on information such as a movement speed and a movement direction. For example, the host controller 1042 may calculate a displacement of the obstacle based on the movement speed of the obstacle and a unit time, and then the host controller 1042 predicts the location information of the obstacle at the next moment based on a location of the obstacle at a current moment and the foregoing displacement. The host controller 1042 may further obtain a point cloud of the obstacle at the next moment based on the location information. In this way, the host controller 1042 may determine a value of a first voxel at the next moment based on the point cloud of the obstacle at the next moment and the resolution of the voxel, so as to obtain the first voxel set of the obstacle at the next moment.

S404: The acceleration controller 1044 determines an invalid moving path based on a mapping relationship between a voxel and a moving path and the first voxel set.

For any first voxel in the first voxel set, the acceleration controller 1044 may search for the mapping relationship between a voxel and a moving path based on an identifier of the first voxel, to obtain a moving path that passes through the first voxel. The moving path that passes through the first voxel is a moving path on which the moving body 10 collides with the obstacle, that is, a moving path that includes a voxel that is the same as the first voxel is an invalid moving path. A voxel that is the same as the first voxel may be understood as: At least one of an identifier of the voxel, a value of the voxel, and an address of a memory corresponding to the voxel is the same as at least one of an identifier of the first voxel, a value of the first voxel, and an address of a memory corresponding to the first voxel.

In some possible implementations, when the mapping relationship between a voxel and a moving path is stored in a form of a table, for example, a mapping relationship table, the acceleration controller 1044 may directly read the mapping relationship table, and then search the mapping relationship table for a moving path corresponding to the first voxel in the first voxel set, so as to determine the invalid moving path.

In some possible implementations, when the mapping relationship between a voxel and a moving path is stored in an address record table and a mapping query table, the acceleration controller 1044 may directly read data in a corresponding address based on a correspondence between an identifier of a voxel such as a number of the voxel and an address of a memory, to obtain a storage address of an identifier of a moving path that passes through the voxel. The storage address is represented by using a start address and a storage length. Based on this, the acceleration controller 1044 may start reading from the start address until a read length reaches the storage length, to obtain the identifier of the moving path that passes through the voxel. A moving path corresponding to the identifier is the invalid moving path.

S406: The host controller 1042 obtains the invalid moving path from the acceleration controller 1044.

Specifically, the acceleration controller 1044 may directly send the invalid moving path to the host controller 1042. In some embodiments, the acceleration controller 1042 may alternatively send an identifier of the invalid moving path to the host controller 1042. For example, the acceleration controller 1044 may send a number of the invalid moving path to the host controller 1042.

S408: The host controller 1042 removes the invalid moving path from a moving path set of the moving body 10, to obtain a valid moving path.

The moving path set includes at least one moving path of the moving body 10, and the host controller 1042 may remove the invalid moving path from the at least one moving path in the moving path set, to obtain the valid moving path. The valid moving path is a moving path on which the obstacle does not collide with the moving body 10.

In some possible implementations, the mapping relationship between a voxel and a moving path may alternatively be a mapping relationship between a voxel and a moving path that does not pass through the voxel. In this way, the acceleration controller 1044 may directly determine the valid moving path based on the first voxel set and the mapping relationship between a voxel and a moving path, and send the valid moving path to the host controller 1042.

The foregoing S404 to S408 are an implementation of determining the valid moving path by the control system 104 according to this embodiment of this application. In another possible implementation of this embodiment of this application, the control system 104 may alternatively determine the valid moving path in another manner.

S410: The host controller 1042 controls the moving body 10 to move along the valid moving path.

Specifically, the host controller 1042 may perform path searching on valid moving paths, so as to select an appropriate moving path from the valid moving paths. For example, the host controller 1042 may perform path searching on the valid moving paths based on a shortest path search algorithm (for example, an A* algorithm), to obtain a valid moving path with a shortest path. Then, the host controller 1042 may control the moving body 10 to move along the shortest valid moving path obtained through searching.

The embodiment shown in FIG. 4 describes an example in which the control system 104 includes a plurality of controllers, and the plurality of controllers cooperate to control movement of the moving body 10. When the control system 104 includes one controller, for a specific implementation of controlling the movement of the moving body 10, refer to related content descriptions. Details are not described herein again.

Based on the foregoing content descriptions, embodiments of this application provide a method for controlling the movement of the moving body 10. In this method, an appearance of the moving body or the obstacle, especially an appearance of a complex moving body or a complex obstacle, is accurately expressed by using a voxel obtained by discretizing space, so that collision detection accuracy is improved and path planning accuracy is further improved. Further, the invalid moving path or the valid moving path is first queried based on a voxel set of the obstacle and a pre-constructed mapping relationship between a voxel and a moving path. Therefore, a moving path on which the moving body 10 collides with the obstacle may be excluded, a search range of the moving path is narrowed, path search efficiency is improved, and path planning efficiency is further improved.

In addition, a data arrangement structure of the foregoing mapping relationship between a voxel and a moving path may be a two-level query structure including the address record table and the mapping query table. An obstacle avoidance identification process of the moving body may be learned by querying the foregoing two tables. Therefore, a process of comparing a large quantity of voxels is simplified into a valid query process, to be specific, a computing-intensive task is converted into an I/O-intensive task, so that time consumption is minimized.

In addition, all data of the mapping relationship table, the address record table, and the mapping query table may be completely stored in the memory such as a DDR. An identifier of a moving path may be represented by using a small quantity of bits. In this way, the address record table, the mapping query table, and the mapping relationship table may occupy only a small quantity of storage space, so that a scale of establishing a path graph is expanded. For example, the memory may store a path graph of far more than 64 K moving paths. After the address record table, the mapping lookup table, and the mapping relationship table are processed offline, the address record table, the mapping lookup table, and the mapping relationship table may be further written into the memory such as the DDR during initialization, so that no time is consumed during running. During the running, only necessary read and query operations are performed to avoid a large amount of repeated and invalid data loading.

It should be further noted that, when an application scenario changes, the mapping relationship between a voxel and a moving path set may be re-written into the memory such as the DDR without changing a hardware circuit. This meets requirements of different users.

With reference to FIG. 1 to FIG. 4, the foregoing describes in detail the method for controlling movement of a moving body 10 according to embodiments of this application. The following describes a control apparatus according to an embodiment of this application with reference to the accompanying drawings. The control apparatus may be a software apparatus that runs on a control system 104, and is configured to implement the method for controlling movement of a moving body 10. Alternatively, the control apparatus may be a hardware apparatus. When running, the hardware apparatus performs the method for controlling movement of a moving body 10 in embodiments of this application.

Figure 5:
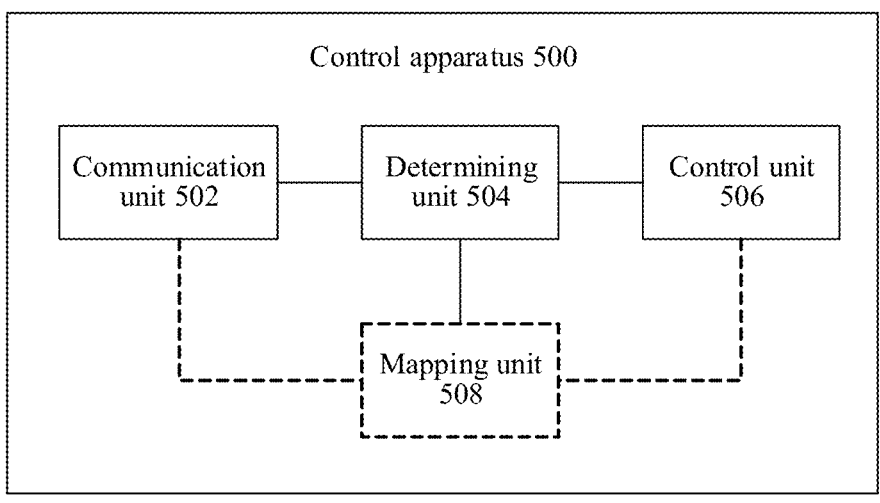
FIG. 5 is a schematic diagram of a structure of a control apparatus according to an embodiment of this application.

Referring to a schematic diagram of a structure of a control apparatus shown in FIG. 5, the apparatus 500 includes:

a communication unit 502, configured to obtain a first voxel set of an obstacle, where the first voxel set includes at least one first voxel that identifies the obstacle in space in which a moving body is located;

a determining unit 504, configured to determine a valid moving path based on a mapping relationship between a voxel and a moving path and the first voxel set, where the valid moving path indicates a moving path on which the moving body 10 does not collide with the obstacle; and a control unit 506, configured to control the moving body 10 to move along the valid moving path.

It should be understood that the apparatus 500 in this embodiment of this application may be implemented by using an application-specific integrated circuit (ASIC) or a programmable logic device (PLD). The PLD may be a complex programmable logic device (CPLD), a field-programmable gate array (FPGA), generic array logic (GAL), or any combination thereof. Alternatively, when the method shown in FIG. 3 or FIG. 4 may be implemented by using software, the apparatus 500 and modules thereof may be software modules.

In some possible implementations, the mapping relationship between a voxel and a moving path is obtained by inverting each voxel that each moving path in the moving path set passes through in the space in which the moving body is located.

In some possible implementations, the apparatus 500 further includes:

a mapping unit 508, configured to: separately obtain a second voxel set that each moving path in the moving path set of the moving body passes through, where the second voxel set includes at least one second voxel; and obtain the mapping relationship between a voxel and a moving path based on the second voxel set that each moving path passes through, where the mapping relationship between a voxel and a moving path indicates a correspondence between each second voxel in the at least one second voxel and each moving path.

In some possible implementations, the determining unit 504 is specifically configured to:

search the mapping relationship between a voxel and a moving path for a third voxel set different from the first voxel in the first voxel set, where the third voxel set includes at least one third voxel; and determine the valid moving path based on the third voxel set.

In some possible implementations, the determining unit 504 is specifically configured to:

search the mapping relationship between a voxel and a moving path for a fourth voxel set the same as the first voxel in the first voxel set, where the fourth voxel set includes at least one fourth voxel;

determine an invalid moving path based on the fourth voxel set; and remove the invalid moving path from the moving path set to obtain the valid moving path.

In some possible implementations, the communication unit 502 is specifically configured to:

obtain the first voxel set of the obstacle by using a depth camera or a laser radar.

In some possible implementations, the obstacle is a dynamic obstacle or a static obstacle, and the moving body is a movable object.

In some possible implementations, the apparatus 500 is deployed in a control system 104, and the control system 104 includes at least one of a central processing unit CPU, a field programmable gate array FPGA, and an application-specific integrated circuit ASIC.

In some possible implementations, the mapping relationship between a voxel and a moving path is stored in a memory accessible to a processor of the control system, and is continuously arranged based on an identifier of the voxel.

The control apparatus 500 according to this embodiment of this application may correspondingly perform the method described in embodiments of this application. In addition, the foregoing and other operations and/or functions of the modules/units of the control apparatus 500 are separately for implementing corresponding procedures of the methods in the embodiments shown in FIG. 4. For brevity, details are not described herein again.

An embodiment of this application further provides a control system 104 for a moving body 10. The control system 104 is specifically configured to implement the functions of the control apparatus 500 in the embodiment shown in FIG. 5.

Figure 6:
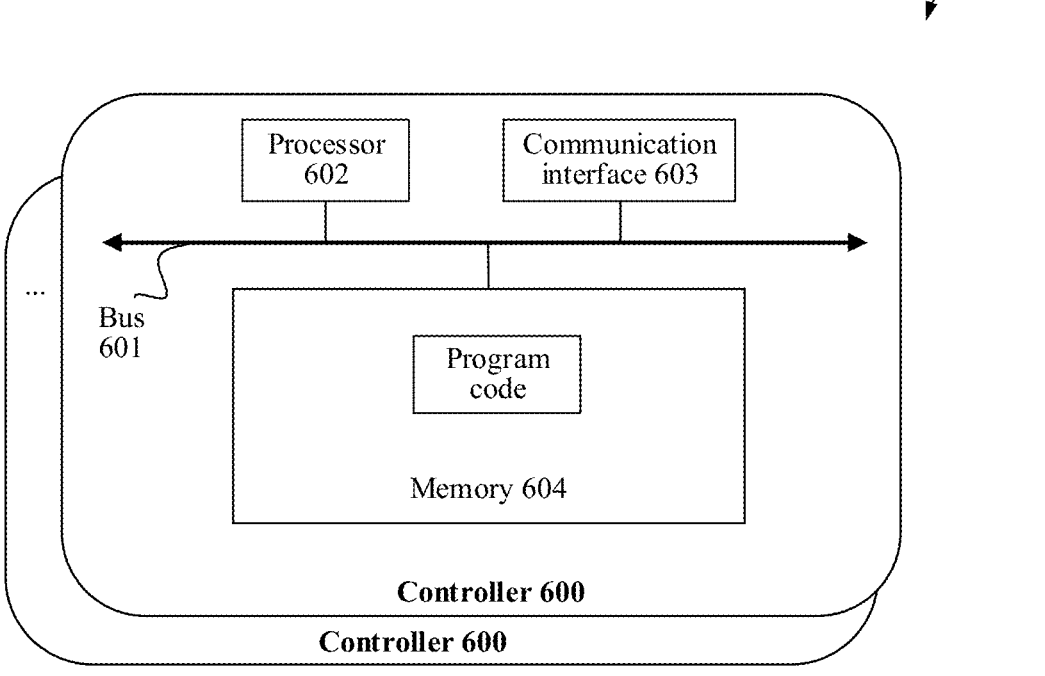
FIG. 6 is a schematic diagram of a hardware structure of a control system according to an embodiment of this application.

FIG. 6 is a schematic diagram of a hardware structure of the control system 104. As shown in FIG. 6, the control system 104 includes at least one controller 600, and the controller includes a bus 601, a processor 602, a communication interface 603, and a memory 604. The processor 602, the memory 604, and the communication interface 603 communicate with each other by using the bus 601.

The bus 601 may be a peripheral component interconnect (PCI) bus, an extended industry standard architecture (EISA) bus, and the like. Further, the bus 601 may alternatively be a CAN bus. The bus may be classified into an address bus, a data bus, a control bus, and the like. For ease of indication, the bus is represented by only one bold line in FIG. 6. However, it does not indicate that there is only one bus or only one type of bus.

The processor 602 may include one or more of a CPU, an FPGA, an ASIC, or another type of processor. For ease of description, in this embodiment of this application, an example in which the processor 602 includes a CPU is used for description. When the control system 104 includes a plurality of controllers 600, different controllers 600 may use different types of processors. For example, one controller 100 may include a CPU, and another controller 100 may include an FPGA.

The communication interface 603 is configured to communicate with the outside. For example, the communication interface 603 is configured to obtain a first set of an obstacle, or send a moving instruction to a power system 106, so that the power system 106 drives, based on the moving instruction, a moving component 108 to move along a valid moving path.

The memory 604 may include one or more of different types, such as an SRAM, a DRAM, or a DDR. Specifically, when the embodiment shown in FIG. 5 is implemented and units of the control apparatus 500 described in the embodiment in FIG. 5 are implemented by using software, software or program code required for performing the functions of the determining unit 504 and the control unit 506 in FIG. 5 is stored in the memory 604.

Specifically, the function of the communication unit 502 is implemented by using the communication interface 603. The communication interface 603 obtains a first voxel set of an obstacle, and transmits the first voxel set to the processor 602 by using the bus 601. The processor 602 executes program code corresponding to each unit stored in the memory 604, for example, program code corresponding to the determining unit 504 and the control unit 506, to perform steps of determining a valid moving path based on a mapping relationship between a voxel and a moving path and the first voxel set, and controlling the moving body to move along the valid moving path.

In some possible implementations, software or program code required for performing the function of the mapping unit 508 in FIG. 5 may also be stored in the memory 604. The processor 602 executes the program code corresponding to the mapping unit 508 and stored in the memory 604, to perform steps of separately obtaining a second voxel set that each moving path in a moving path set of the moving body passes through, and obtaining the mapping relationship between a voxel and a moving path based on the second voxel set that each moving path passes through.

In some possible implementations, the processor 602 is further configured to execute the program code stored in the memory 604, to perform steps of any implementation of the method for controlling movement of a moving body 10 in the embodiment shown in FIG. 4.

An embodiment of this application further provides a moving body shown in FIG. 2. The moving body includes a control system 104, configured to implement the method in FIG. 3 or FIG. 4. For brevity, details are not described herein again.

In some possible implementations, the host controller 1042 and the acceleration controller 1044 shown in FIG. 2 may alternatively be deployed together.

In some other possible implementations, the moving body is a movable device such as a robot or a vehicle.

All or some of the foregoing embodiments may be implemented by using software, hardware, firmware, or any combination thereof. When implemented by using software, all or some of the foregoing embodiments may be implemented in a form of a computer program product. The computer program product includes one or more computer instructions. When the computer program instructions are loaded or executed on a computer, all or some of the processes or the functions according to embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive (SSD).

The computer program product may be a software installation package. When any method of the foregoing method for controlling movement of a moving body 10 needs to be used, the computer program product may be downloaded and executed on a computing device.

Descriptions of procedures or structures corresponding to the foregoing accompanying drawings have respective focuses. For a part that is not described in detail in a procedure or structure, refer to related descriptions of other procedures or structures.

What is claimed is:

1. A method for controlling movement of a moving body, wherein the method comprises:

obtaining, by a system, a first voxel set of an obstacle, wherein the first voxel set comprises at least one first voxel that identifies the obstacle in a space in which the moving body is located, wherein the obstacle is a dynamic obstacle, and the obtaining the first voxel set of the obstacle comprises: obtaining a first point cloud of a current moment based on location information of the dynamic obstacle at the current moment; obtaining a second point cloud of a next moment based on the location information of the dynamic obstacle at the current moment, a movement speed of the dynamic obstacle, and a movement direction of the dynamic obstacle, and obtaining the first voxel set based on the first point cloud and the second point cloud, wherein each voxel in the first voxel set is obtained based on a resolution of the voxel and a corresponding point in the first point cloud or the second point cloud;

determining, by the system, a valid moving path based on a mapping relationship between a voxel and a moving path and the first voxel set, wherein the valid moving path indicates a moving path on which the moving body does not collide with the obstacle; and controlling, by the system, the moving body to move along the valid moving path.

2. The method according to claim 1, wherein the mapping relationship between a voxel and a moving path is obtained by inverting each voxel that each moving path in a moving path set passes through in the space in which the moving body is located.

3. The method according to claim 1, wherein before the obtaining a first voxel set of an obstacle, the method further comprises:

separately obtaining a second voxel set that each moving path in a moving path set of the moving body passes through, wherein the second voxel set comprises at least one second voxel; and obtaining the mapping relationship between a voxel and a moving path based on the second voxel set that each moving path passes through, wherein the mapping relationship between a voxel and a moving path indicates a correspondence between each second voxel in the at least one second voxel and each moving path.

4. The method according to claim 1, wherein the determining a valid moving path based on a mapping relationship between a voxel and a moving path and the first voxel set comprises:

searching the mapping relationship between a voxel and a moving path for a third voxel set, wherein the third voxel set comprises at least one third voxel that is different from the first voxel in the first voxel set; and determining the valid moving path based on the third voxel set.

5. The method according to claim 1, wherein the determining a valid moving path based on a mapping relationship between a voxel and a moving path and the first voxel set comprises:

searching the mapping relationship between a voxel and a moving path for a fourth voxel set, wherein the fourth voxel set comprises at least one fourth voxel that is same as the first voxel in the first voxel set;

determining an invalid moving path based on the fourth voxel set; and removing the invalid moving path from the moving path set to obtain the valid moving path.

6. The method according to claim 1, wherein the obtaining a first voxel set of an obstacle comprises:

obtaining the first voxel set of the obstacle by using a depth camera or a laser radar.

7. The method according to claim 1, wherein the moving body is a movable object.

8. The method according to claim 1, wherein the method is performed by at least one processor of the system, and the at least one processor comprises at least one of a central processing unit (CPU), a field programmable gate array (FPGA), or an application-specific integrated circuit (ASIC).

9. The method according to claim 8, wherein the mapping relationship between a voxel and a moving path is stored in at least one memory accessible to the at least one processor, and is continuously arranged based on an identifier of the voxel.

10. A control system for a moving body, wherein the control system comprises at least one processor and at least one memory, the at least one memory stores computer-executable instructions, that when executed by the at least one processor, cause the control system to:

obtain a first voxel set of an obstacle, wherein the first voxel set comprises at least one first voxel that identifies the obstacle in a space in which the moving body is located, wherein the obstacle is a dynamic obstacle, and the obtaining the first voxel set of the obstacle comprises: obtaining a first point cloud of a current moment based on location information of the dynamic obstacle at the current moment; obtaining a second point cloud of a next moment based on the location information of the dynamic obstacle at the current moment, a movement speed of the dynamic obstacle, and a movement direction of the dynamic obstacle, and obtaining the first voxel set based on the first point cloud and the second point cloud, wherein each voxel in the first voxel set is obtained based on a resolution of the voxel and a corresponding point in the first point cloud or the second point cloud;

determine, a valid moving path based on a mapping relationship between a voxel and a moving path and the first voxel set, wherein the valid moving path indicates a moving path on which the moving body does not collide with the obstacle; and control the moving body to move along the valid moving path.

11. The control system according to claim 10, wherein the mapping relationship between a voxel and a moving path is obtained by inverting each voxel that each moving path in a moving path set passes through in the space in which the moving body is located.

12. The control system according to claim 10, wherein the computer-executable instructions, when executed by the at least one processor, cause the control system to:

separately obtain a second voxel set that each moving path in a moving path set of the moving body passes through, wherein the second voxel set comprises at least one second voxel; and obtain the mapping relationship between a voxel and a moving path based on the second voxel set that each moving path passes through, wherein the mapping relationship between a voxel and a moving path indicates a correspondence between each second voxel in the at least one second voxel and each moving path.

13. The control system according to claim 10, wherein the computer-executable instructions, when executed by the at least one processor, cause the control system to:

search the mapping relationship between a voxel and a moving path for a third voxel set, wherein the third voxel set comprises at least one third voxel that is different from the first voxel in the first voxel set; and determine the valid moving path based on the third voxel set.

14. The control system according to claim 10, wherein the computer-executable instructions, when executed by the at least one processor, cause the control system to:

search the mapping relationship between a voxel and a moving path for a fourth voxel set, wherein the fourth voxel set comprises at least one fourth voxel that is same as the first voxel in the first voxel set;

determine an invalid moving path based on the fourth voxel set; and remove the invalid moving path from the moving path set to obtain the valid moving path.

15. The control system according to claim 10, wherein the computer-executable instructions, when executed by the at least one processor, cause the control system to:

obtain the first voxel set of the obstacle by using a depth camera or a laser radar.

16. The control system according to claim 10, wherein the moving body is a movable object.

17. The control system according to claim 10, wherein the at least one processor comprises at least one of a central processing unit (CPU), a field programmable gate array (FPGA), or an application-specific integrated circuit (ASIC).

18. The control system according to claim 10, wherein the mapping relationship between a voxel and a moving path is stored in the at least one memory accessible to the at least one processor, and is continuously arranged based on an identifier of the voxel.

19. A non-transitory computer-readable storage medium, comprising computer-readable instructions, wherein when the computer-readable instructions are run on a computer, the computer is enabled to:

obtain a first voxel set of an obstacle, wherein the first voxel set comprises at least one first voxel that identifies the obstacle in space in which a moving body is located, wherein the obstacle is a dynamic obstacle, and the obtaining the first voxel set of the obstacle comprises: obtaining a first point cloud of a current moment based on location information of the dynamic obstacle at the current moment; obtaining a second point cloud of a next moment based on the location information of the dynamic obstacle at the current moment, a movement speed of the dynamic obstacle, and a movement direction of the dynamic obstacle, and obtaining the first voxel set based on the first point cloud and the second point cloud, wherein each voxel in the first voxel set is obtained based on a resolution of the voxel and a corresponding point in the first point cloud or the second point cloud;

determine, a valid moving path based on a mapping relationship between a voxel and a moving path and the first voxel set, wherein the valid moving path indicates a moving path on which the moving body does not collide with the obstacle; and control the moving body to move along the valid moving path.

20. The computer-readable storage medium according to claim 19, wherein the mapping relationship between a voxel and a moving path is obtained by inverting each voxel that each moving path in a moving path set passes through in the space in which the moving body is located.

* * * * *